No. 629,861. Patented Aug. 1, 1899.
F. L. KONRAD.
METHOD OF FIREPROOFING WOOD.
(Application filed Apr. 4, 1898.)
(No Model.)
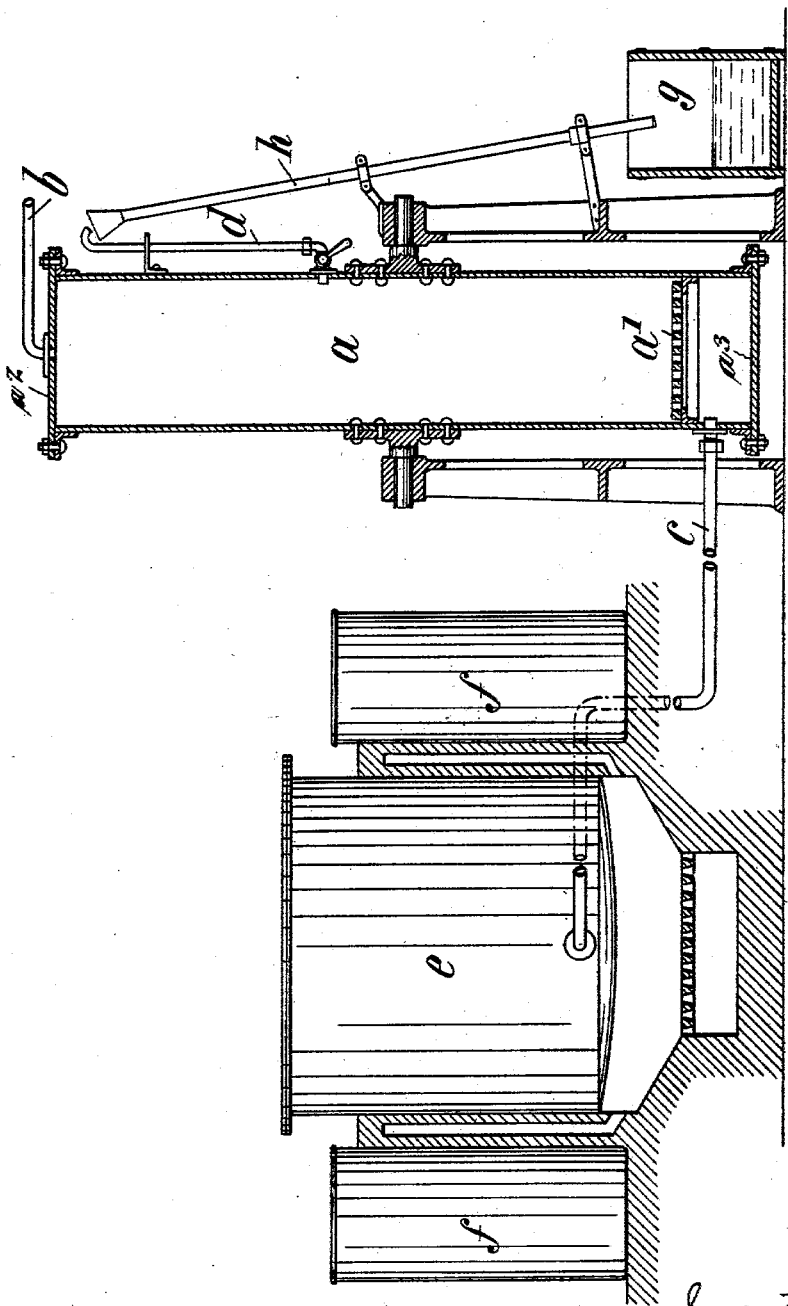

United States Patent Office.

FRANZ LUDWIG KONRAD, OF MÜNSTER, GERMANY, ASSIGNOR OF ONE-HALF TO GEORG WILHELM ONKEN, OF HAMBURG, GERMANY.

METHOD OF FIREPROOFING WOOD.

SPECIFICATION forming part of Letters Patent No. 629,861, dated August 1, 1899.

Application filed April 4, 1898. Serial No. 676,456. (No specimens.)

*To all whom it may concern:*

Be it known that I, FRANZ LUDWIG KONRAD, a subject of the Prince Regent of Bavaria, and a resident of Münster, in the Province of Westphalia, Germany, have invented certain new and useful Improvements in the Preservation and Fireproofing of Wood and the Like, of which the following is a specification.

This invention has relation to the art of preserving and fireproofing wood; and before my invention it has been the common practice to treat wood either with a preserving or antiseptic solution of salts capable of forming insoluble compounds with albumen or the albuminous constituents of the wood. It has also been the common practice before my invention to treat wood with solutions of salts capable of making the wood fireproof—as borax, alum, sulfate of iron, water, glass, &c. These salts act independently and have no chemical relation or affinity, the salts of one class acting as antiseptics and those of the other class forming an incombustible coating on the wood and on its fibers.

I have discovered that wood can be preserved from decay and at the same time rendered fireproof by means of salts which react upon each other or upon one another, and thus produce the results aimed at.

In carrying out my invention, broadly speaking, I form on the wood, on its fibers and in its pores, borate of calcium as a means for rendering the wood fireproof and at the same time as a means of preserving it from decay. This I attain by impregnating wood, which has preferably first been air-dried, with milk of lime, the latter acting as an antiseptic and tending to coagulate the albumen or albuminous constituents of the wood. I next dry and impregnate or saturate the wood with a solution of sulfate of ammonia and boric acid, these salts reacting upon the lime to form incombustible calcium borate, thus rendering the wood fireproof.

I have found that the penetration of the milk of lime and solution of sulfate of ammonia and boric acid and the reaction of the last-named solution upon the calcium are materially enhanced by using a lukewarm milk of lime and a hot solution of sulfate of ammonia and boric acid. I have also found that the results aimed at are attained by means of milk of lime composed of about seven grams of pulverized quicklime and one thousand grams of water and by means of a solution composed of about fourteen grams of boric acid, one hundred and fifteen grams of sulfate of ammonia, and one thousand grams of water.

The saturation of the wood with milk of lime can be ascertained by means connected with the apparatus presently to be described and especially designed for the carrying out of my invention, while the saturation of the lime-impregnated wood with the reacting solution depends, of course, upon the nature of the wood treated—namely, its density and dimensions—the operation requiring four hours, more or less.

Referring now to the accompanying drawing, which illustrates the apparatus above referred to by a vertical sectional view, $a$ indicates a vessel, shown in the form of a cylinder revoluble on trunnions having their bearings in suitable standards, so that the said vessel may be tilted for the purpose of charging and discharging it, the said cylinder being closed fluid-tight by heads $a^2$ $a^3$, bolted thereto. Above one of said heads is arranged a grating $a'$ for supporting the wood to be treated, which is placed on end on said grating, and through the other head the vessel $a$ is connected by a pipe $b$ with a suitable exhausting apparatus, as an air-pump. (Not shown.)

In charging or discharging the vessel $a$ the head $a^2$ is removed, and at a point nearer to said head than to the head $a^3$ there is a valved pipe $d$, which extends near to the head $a^2$ and discharges into the bell-mouthed pipe $h$, that discharges into a vessel $g$.

To the chamber formed between the grating $a'$ and head $a^3$ of vessel $a$ is connected a pipe $c$, through which the milk of lime and reacting solution are forced or admitted into said vessel.

I have hereinabove stated that better results are obtained by using lukewarm milk of lime and a hot reacting solution. To this end I provide means for heating the same. In the drawing I have shown a vessel e, arranged above a fuel-grate in a structure having its draft-flue arranged to encompass said vessel, and auxiliary storage vessels f, located about said flue for preheating the reacting solution. The vessel for the milk of lime (not shown) may be heated in the same or in any other desired manner.

The operation of treating and fireproofing wood in accordance with my process is as follows: Assuming that the vessel a is charged with previously-dried wood and the valve or stop-cock in pipe d closed and the pipe c connected with a force-pump (also not shown) and the said force-pump with the vessel containing the milk of lime and the pipe b with the exhauster, the latter is now set in operation to exhaust the air not only from vessel a, but also from the pores of the wood as much as possible. This done, milk of lime is forced into vessel a through pipe c and the stop-cock or pipe d is opened, and when the milk of lime commences to trickle from said pipe the operation of impregnation or saturation is completed and the excess of milk of lime removed from the vessel and air forced through it to dry the wood. After the last-named operation the vessel c is connected with the vessel a below its grating and the hot reacting solution therein admitted to or forced into said vessel, the wood being subjected to the action of said solution for a sufficient length of time to convert the lime into calcium borate.

Having thus described my invention, what I claim as new therein, and desire to secure by Letters Patent, is—

1. In the preservation and fireproofing of wood, the improvement which consists in forming borate of calcium on the fibers and in the pores of the wood, for the purpose set forth.

2. In the preservation and fireproofing of wood, the improvement which consists in treating previously-dried wood with milk of lime, and after drying, with a solution of boric acid and sulfate of ammonium, for the purpose set forth.

3. In the preservation and fireproofing of wood, the improvement which consists in treating previously-dried wood with lukewarm milk of lime, and after drying, with a solution of boric acid and sulfate of ammonia, for the purpose set forth.

4. In the preservation and fireproofing of wood, the improvement which consists in treating previously-dried wood with milk of lime, and after drying with a hot solution of boric acid and sulfate of ammonia, for the purpose set forth.

FRANZ LUDWIG KONRAD.

Witnesses:
   GEORG TIEDGE,
   E. H. L. MUMMENHOFF.